Sept. 2, 1969          G. M. DAVIDSON ET AL          3,464,255
ACCELEROMETER AND METHOD FOR ITS CALIBRATION
Filed Oct. 3, 1963
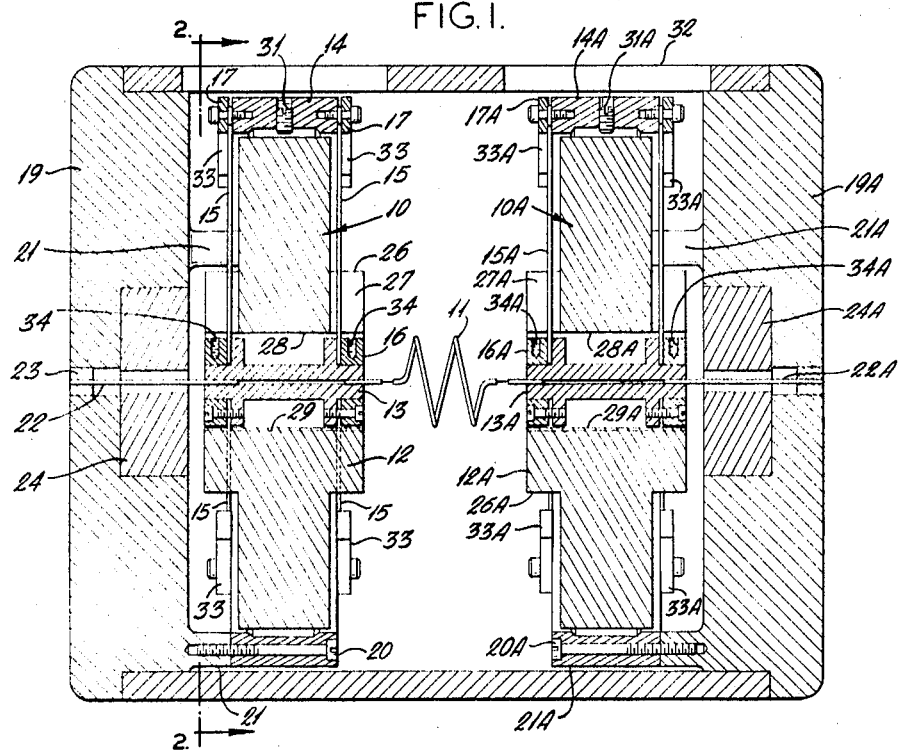
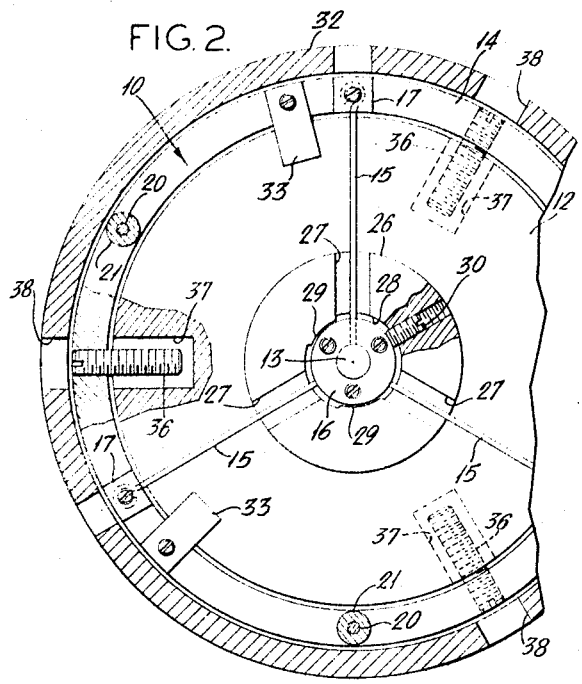
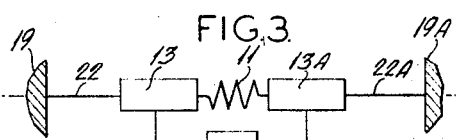
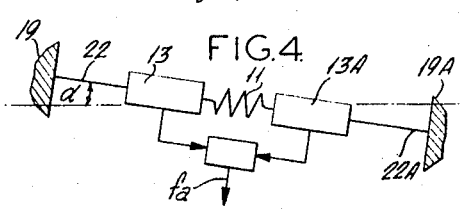
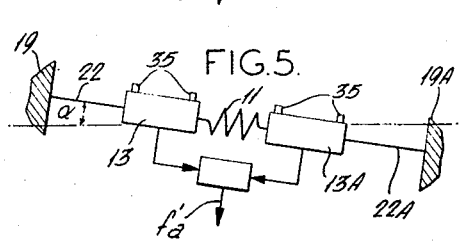
INVENTORS
GARETH M. DAVIDSON
CHARLES T. DAVENPORT
BY Howson & Howson
ATTYS.

United States Patent Office 3,464,255
Patented Sept. 2, 1969

3,464,255
ACCELEROMETER AND METHOD FOR ITS
CALIBRATION
Gareth M. Davidson, Bronx, and Charles T. Davenport,
Manhasset, N.Y., assignors to AMBAC Industries, Incorporated, a corporation of New York
Filed Oct. 3, 1963, Ser. No. 313,705
Int. Cl. G01p 15/10
U.S. Cl. 73—1                                    11 Claims The present invention relates to accelerometers and has particular reference to accelerometers of the vibrating-string class of instrument for sensing very low accelerations such as are encountered in space travel.

The vibrating-string accelerometer of usual construction includes a pair of strings in axial alignment, joined at their adjacent ends by a proof-mass and mounted under tension by attachment of their remote ends to the frame of the accelerometer. The proof-mass is supported transversely of the string axis by cross tapes attached to the frame so as to restrict the motion of the proof-mass to a direction along the length of the strings. The proof-mass is usually separated into a pair of masses joined by an elastic element or spring for purposes of stability and isolation, as described and claimed in the copending application Ser. No. 586,615 of Bock et al., filed May 22, 1956, now Patent No. 3,332,290, and of common assignee herewith. The strings are vibrated at their natural frequencies, usually by electronic means, and since the frequency of vibration depends upon the tension in the strings it constitutes a measure of the force of acceleration on the proof-mass.

The accelerations to be measured in space are often very small, for example very small fractions of the acceleration of gravity at the earth's surface, and hence require use of a relatively large proof-mass in order to give adequately large changes in the natural frequencies of the strings. However, when such a large proof-mass is mounted to the strings in the earth's gravity field it can readily cause the strings to be stretched harmfully, even to the breaking point, when the sensitive axis of the accelerometer is oriented other than horizontally, particularly when it is subjected to additional accelerations during launching of a space vehicle containing it. At such times harmful radial or angular motion of the proof-mass may also tend to occur.

In our structure the latter difficulties are obviated by the provision of stop means to limit at least one, and preferably all, of the axial, radial, and angular motions of the proof-mass so that the forces exerted by the heavy proof-mass on the apparatus attached thereto are held within safe limits when near the earth or subjected to strongly-accelerative motion.

A problem which is even more difficult to solve arises in attempting to calibrate such a sensitive accelerometer on earth so as to provide accurate indications of the values of acceleration corresponding to frequency changes of the strings. Calibration by applying known accelerative forces to the instrument is impractical because of the extremely small accelerations for which the instrument becomes saturated or even damaged. For example, applying a known acceleration to the instrument by tilting it at an angle of only ten seconds from the horizontal in the earth's field applies an effective acceleration of $5 \times 10^{-4}$ g., which is sufficient to saturate a sensitive instrument. Furthermore, control of the tilt angle and knowledge of the gravitational field would be insufficiently precise to give the required accuracy of calibration by this method. A precision centrifuge designed to apply the necessary extremely small accelerations would be almost impossible to fabricate and operate with the necessary accuracy, known types of centrifuges being normally effective to apply accelerations many times that of gravity, rather than extremely small fractions of the acceleration of gravity.

To accomplish the required calibration in accordance with the invention in one of its aspects, the proof-mass is made up of two components, one providing a light core mass attached to the strings and the other a heavy main mass preferably substantially surrounding at least a portion of the core mass and which can be attached to or released from the core mass at will. The accelerometer is calibrated with only the core mass attached to the springs, and the calibration is then adjusted according to the ratio of the total mass of the proof-mass with the main mass attached, to the mass of the proof-mass with the main mass detached. The mass or weight of the main mass can be accurately and precisely determined prior to assembly in the accelerometer, and will not change after assembly. The weight or mass of the core mass can also be precisely determined prior to assembly, but when the core mass only is connected to the strings the effective mass acting on the strings, i.e. the effective proof-mass, will be due to the composite effect of the masses of the many and various elements connected to the strings, such as the strings themselves, the cross tape supports and the central spring. Hence merely weighing the core mass without the main mass will not give the effective proof mass with the core mass only attached to the strings, and other means must therefore be used to obtain this value with sufficient accuracy.

The present invention therefore, also includes a new method and means for calibrating such an accelerometer, comprising deriving indications of the effective mass of the core portion of the proof mass by connecting only the core mass in the accelerometer, deriving indications of the calibration of the accelerometer in the earth's gravity field with the core mass only attached to the strings, comparing the outputs of the accelerometer with and without small added calibrating weights of known mass, and then securing the main mass to the core mass and adjusting the calibration of the accelerometer according to the above-mentioned ratio of proof-masses with and without the main mass attached.

For a more complete understanding of the invention reference may be had to the following detailed description, taken together with the accompanying drawing, the figures in which are not necessarily to scale and are by way of example only, in which drawing:

FIGURE 1 is a longitudinal cross-sectional view of an accelerometer made in accordance with the invention;

FIGURE 2 is a sectional view, partly broken away, through plane 2—2 of FIGURE 1; and FIGURES 3, 4 and 5 are diagrammatic illustrations of three successive steps in the calibration procedure in accordance with the invention.

Referring now particularly to FIGURES 1 and 2 of the drawings, there is shown therein a pair of proof-mass members 10 and 10A which are joined by the soft spring 11. The left-hand and right-hand halves of the apparatus of FIGURE 1 are similar and the description of the details thereof will therefore be confined to only the left-hand half of the accelerometer. As shown, the proof-mass member 10 includes the main mass member 12 and the core mass member 13. The core mass member 13, which may be generally cylindrical, is suspended from a caging ring 14 by lateral supports comprising the cross-support tapes 15, three such tapes being equi-angularly disposed at each end of the core mass member 13. The cross-support arrangement is preferably in the form of a spider, the center hub of which surrounds and is attached to the core mass by clamping rings such as 16, the three tapes 15 being attached to the caging ring 14 by the clamps 17.

The caging ring 14 is firmly attached to the end support 19, as by screws such as 20 which hold the ring 14 against spaced mounting lugs such as 21 formed in the support 19, for example. One end of vibrating string 22 is attached to the mass 13, the other end being attached to a clamping means 23 in the end support 19. The magnet 24 held in support 19 provides a transverse magnetic field across the string 22. In a manner which is now well known, when the string 22 is an electrically-conducting wire it may be kept in vibration at its natural frequency by connecting it effectively to the input and output of an electronic oscillator-amplifier (not shown). The current in the wire 22, that is the amplifier output, forces the wire into motion in the magnetic field, and the motion of the wire in the field produces a potential difference which is applied to the amplifier input.

The main mass 12 includes a hub portion 26 which contains radial recesses such as 27 in which the cross-support tapes 15 are located. The central bore 28 of the main mass 12 is not cylindrical, but includes two axially extending land portions 29, 29 spaced approximately 120 degrees apart. Set screws 30, one on each end of the mass 12 and spaced angularly by about 120 degrees from the lands 29, may be turned to exert force against the core mass 13, thereby to bring the land areas 29 in clamping contact with the core mass 13 and hold the two masses 12 and 13 firmly together.

In the calibration procedure to be described later, the masses 12 and 13 are separated from each other and main mass 12 is held firmly out of contact with core mass 13. To this end the caging ring 14 has at least three set screws 31 (only one being shown in the drawing) equally-spaced angularly around the circumference of the ring, which screws can be tightened against main mass 12 after screw 30 has been withdrawn. The set screws 31 will then clamp the main mass 12 centered in a position wherein the lands 29 are out of contact with the core mass 13 so as to permit axial freedom of motion of the core mass 13.

The described structure is repeated at the right-hand side of the accelerometer of FIGURE 1, wherein the proof-mass 10A includes a main mass 12A and a core mass 13A. A vibrating string or wire 22A is connected between the mass 13A and the end support 19A, and is located within the transverse field of magnet poles 24A. The structure is completed by the cylindrical frame 32 to which the end supports 19, 19A are attached.

Mechanical stops 33, 33A are attached to the caging rings to limit the axial motion of the masses 10, 10A while under the influence of gravity near the earth's surface, in which position the acceleration experienced is many times greater than the maximum acceleration to be measured by the accelerometer in space. The masses 10, 10A remain "beached" against the stops 33, 33A in the initial stages of flight of a vehicle carrying the accelerometer, i.e. during acceleration of the vehicle into space, and during this "beaching" period the accelerometer is inoperative. After the vehicle has reached a nearly constant velocity so that the acceleration approaches nearer to zero, the masses 10, 10A leave the stops 33, 33A and the accelerometer becomes operative. Preferably angular and radial stop members such as 36 are also employed to limit the extent of angular and radial motion of the masses 10, 10A near the earth and during initial acceleration into space. Each of the masses 10, 10A is preferably provided with three such stop members 36, spaced from each other circumferentially about the circumference of the proof mass by about 120 degrees. Each member 36 is attached to its associated caging ring, as by threaded engagement therewith, and protrudes into a corresponding cylindrical recess 37 extending radially into the outer periphery of the proof-mass. A corresponding number of openings 38 in the frame 32 provides access to each of the members 36 for purpose of adjustment, insertion or removal thereof. Each recess 37 is sufficiently large to provide clearance about the sides and end of corresponding member 36. This clearance, as well as that between the axial stops such as 33, 33A and masses 10, 10A is great enough to permit a substantial degree of free displacement of the masses axially, radially and angularly, but limits these displacements to an amount less than that producing forces sufficient to break or damage the strings 22, 22A or other members associated with the masses when the instrument is subjected to a one-$g$ field. In particular, the clearance for the axial stops is adequate to accommodate the axial motion of the proof mass during normal use of the apparatus as an accelerometer.

The accelerometer must be calibrated prior to flight, and hence on earth and in the environment of a one-$g$ gravity field. For the reasons indicated hereinbefore, the heaviness of the proof masses 10, 10A precludes calibration of the assembled device directly. The calibration is instead accomplished by the novel method which will now be described in detail.

The main masses 12, 12A are separated from the respective core masses 13, 13A and held firmly clamped to the caging rings 14, 14A by tightening the set screws 31, 31A so that the core masses 13, 13A alone are attached to the strings 22, 22A. The sensitive axis of the accelerometer is then determined and set in a horizontal position as illustrated in FIGURE 3. This may be accomplished by rotating the accelerometer about an axis substantially parallel to the strings 22, 22A, detecting the variation in difference between the frequencies of vibration of the strings 22, 22A during rotation, and adjusting the angular position of the axis of rotation so as to reduce such variations. When the difference frequency exhibits substantially no variation with rotation, the accelerometer is rotating about its sensitive axis. The accelerometer-sensitive axis may then be leveled by conventional mechanical levelling means.

When the sensitive axis is horizontal the difference frequency $f_o$ between the vibration frequencies of the two strings is detected and recorded, as by heterodyning the electrical signals driving them to obtain a difference frequency and applying the difference frequency to a frequency-measuring device and recorder. This difference $f_o$ may or may not be zero, and under normal conditions it will not be zero due to unavoidable minor differences in the nature and tension of the two strings. The accelerometer axis is then tilted through a small angle $\alpha$, as illustrated in FIGURE 4, and the difference $f_a$ between the frequencies of the strings in this position is detected and recorded. The change $f_d$ in difference frequency due to the change in angle $\alpha$ is $f_a - f_o$.

Next a small mass, in the form of the four screws 35 in FIGURE 5, is added to each end of both core masses in the tapped holes 34, 34A in the collars 16, 16A of FIGURE 1 and a new difference frequency $f_a'$ is observed corresponding to a new change $f_a' - f_o$ in difference frequency with respect to the original difference frequency $f_o$. Designating the total mass of the four calibrating screws on the two parts of the core mass as $\Delta m$ and the effective proof-mass of the core mass without the screws as $m_o$, since for a fixed inclination of the sensitive axis the difference frequency varies linearly with the magnitude of the proof mass the following relation holds:

$$\frac{f_a - f_o}{f_a' - f_o} = \frac{m_o}{m_o + \Delta m} = \frac{f_d}{f_d + \Delta f_d} \tag{1}$$

where $$f_d = f_a - f_o$$

and $$\Delta f_d = f_a' - f_a$$

Solving Equation 1 for $m_o$, it will be seen that $$m_o = \frac{\Delta m}{\Delta f_d} f_d = \Delta m \frac{f_a - f_o}{f_d - f_a}$$

For more accurate determination of $m_o$, several different values of $\Delta m$ may be added to the core mass and a curve of $\Delta m$ versus $\Delta f_d$ plotted. The average slope of this curve will yield a more accurate value of $m_o$.

After $m_0$ has been determined, the calibrating screws are removed and the calibration of the accelerometer using only the core mass is carried out. This calibration gives an indication of the relation of the frequency differences from the accelerometer to the acceleration sensed by the accelerometer. In this procedure the accelerometer is subjected to known accelerations such as zero, + one $g$, − one $g$, by placing it in horizontal and vertical positions, and the frequency difference from the accelerometer is measured and recorded. After this the main mass 12, 12A is attached to core mass 13, 13A as explained previously and the calibration adjusted accordingly. Thus, if the mass of main mass 12, 12A is M, and the residual effective proof-mass of core mass 13, 13A is $m_0$ as determined by the procedure described previously, then by attaching the main mass 12, 12A the sensitivity of the accelerometer is increased by the factor $M+m_0/m_0$, i.e. the sensitivity is $M+m_0/m_0$ of what it was with only the core mass attached to the strings. As an example, if $M=10$ pounds, $m_0=0.01$ pound and the calibration as determined with core mass 13 only shows that a frequency difference from the accelerometer of 100 c.p.s. is equivalent to an acceleration of one $g$, then with the main mass attached the calibration is such that 100 c.p.s. change in accelerometer difference frequency is equivalent to $m_0 g/M+m_0=0.01g/10.01$, or substantially 1/1000 $g$.

The calibration is carried out as described above because, while the mass M of main mass 12, 12A can be accurately determined prior to assembly, the residual effective core mass $m_0$, i.e. that mass which affects the tension in strings 22, 22A in the absence of the main mass, includes not only the mass of core mass 13 but also the effects caused by the weights or restraints of the strings themselves, the cross supports 15, and the center spring 11 for example, which can be determined only after the accelerometer is assembled. Without the separable-mass arrangement the accelerometer could not be calibrated in the one-$g$ field of the earth.

It will be understood that the calibration factor relating changes in accelerometer output to acceleration may correspond to the scale factor of equipment which, during normal use, responds to the accelerometer output to provide indications of the magnitude of the acceleration. The change in calibration which is made when the main mass M is made operative may therefore comprise a corresponding change in the scale factor of the frequency-sensing and indicating equipment.

Furthermore, automatic equipment may be used to measure and record the various output frequencies produced by the accelerometer during determination of the effective core mass $m_0$ and during calibration of the accelerometer with the main mass removed, and computer apparatus may be used to compute $m_0$ and the sensitivity ratio $M+m_0/m_0$, and to control the scale factor of the acceleration indicator accordingly.

We claim:
1. Accelerometer apparatus comprising:
a suporting frame;
a vibrating-string element and a proof-mass element mounted from said frame so that the natural frequency of vibration of said vibrating-string element varies with acceleration of said frame to an extent dependent upon the magnitude of the mass of said proof-mass element;
said proof-mass element comprising a first part, a second part having a mass large compared with that of said first part, and means for mounting said second part on said first part; and
means for attaching said second part to said frame when separated from said first part, in a position permitting motion of said first part independently of said second part.

2. Apparatus in accordance with claim 1, comprising also stop means for positively limiting displacement of said proof-mass element with respect to said frame to a range for which the tension produced in said vibrating string element by said displacement is less than that steady value of tension which would damage said vibrating string element.

3. Apparatus in accordance with claim 2, in which said stop means comprises means for limiting the angular, axial and radial motion of said proof-mass element.

4. A device according to claim 1, comprising means for detachably mounting to said first part at least one additional weight having a mass small compared with that of said second part of said proof-mass element.

5. A device according to claim 1, in which said means for attaching said second part to said first part comprises means for clamping said second part to said first part.

6. A device according to claim 1, in which said means for attaching said second part to said frame comprises clamping means for moving said second part out of contact with said first part and for clamping it with respect to said frame.

7. A method for calibrating a sensitive accelerometer of the type employing a proof mass made up of a light core mass, a separable heavy main mass attachable to said light core mass, and acceleration-sensing means connected to said core mass, comprising:
measuring the output $f_0$ of said accelerometer with its sensitive axis horizontal and with said main mass separated from said core mass;
measuring the output $f_a$ of said accelerometer with its sensitive axis at a known angle with respect to the horizontal and with said main mass separated from said core mass;
measuring the output $f'_a$ of said accelerometer with its sensitive axis at said known angle with respect to the horizontal, with said main mass separated from said core mass, and with a weight of known mass small compared with said main mass added to said core mass, to derive indications of the effective mass of said core mass;
subjecting said accelerometer to known accelerations with said main mass separated from said core mass while supplying the output of said accelerometer to an output-measuring device to obtain a calibration of said accelerometer with said main mass separated from said core mass; and
attaching said main mass to said core mass to provide an accelerometer having a sensitivity greater than that of said accelerometer with said main mass separated by a factor $M+m_0/m_0$, where M is the mass of said main mass and $m_0$ is said effective mass of said core mass.

8. A method for calibrating an accelerometer containing a proof mass separable into a light core mass and a heavy main mass of accurately known weight, and in which said core mass is attached to acceleration-detecting means, said method comprising:
separating said main mass from said core mass;
determining the location of the sensitive axis of said accelerometer with said main mass separated from said core mass;
orienting said accelerometer so that its sensitive axis is horizontal, and then detecting the output $f_0$ of said accelerometer with said main mass separated;
tilting said sensitive axis of said accelerometer through a known angle with respect to the horizontal and then detecting the output $f_a$ of said accelerometer with said main mass separated;
adding to said core mass a known calibrating weight of known mass $\Delta m$ small compared with said main mass and detecting the output $f_a'$ of said accelerometer, with said main mass separated;
deriving from said output $f_0$, $f_a$ and $f_a'$ indications of the effective core mass $m_0$, where $$m_o = \Delta m \frac{f_a - f_o}{f_a' - f_a}$$

applying known accelerations to said accelerometer with said main mass separated and said calibrating weight removed, while deriving indications of the output of said accelerometer, to obtain a calibration relating said indications to said known accelerations;

attaching said main mass to said core mass to produce a high sensitivity accelerometer; and modifying said calibration by substantially the ratio of said effective core mass to the total mass of said proof mass.

9. A method in accordance with claim 8, comprising successively adding calibrating weights of different masses to said core mass while detecting the outputs of said accelerometer with said main mass separated, deriving from said outputs a plurality of indications of said effective core mass $m_o$, and averaging said indications.

10. In accelerometer apparatus, a proof mass comprising a relatively light core member, a member substantially surrounding at least a portion of said core member and having a mass large compared with that of said core member, means for detachably affixing said core member to said surrounding member, and means for clamping said surrounding member out of contact with said core member.

11. In accelerometer apparatus, a proof mass comprising a relatively light core member, a member substantially surrounding at least a portion of said core member and having a mass large compared with that of said core member, means for detachably affixing said core member to said surrounding member, a support member, and adjustable means associated with said support member for centering said surrounding member to move it out of contact with said core member.

References Cited
UNITED STATES PATENTS

| | | | |
|---|---|---|---|
| 2,924,092 | 2/1960 | Bourns et al. | 73—1 |
| 2,968,950 | 1/1961 | Dunbar et al. | 73—517 X |
| 3,010,325 | 11/1961 | Harkness | 73—517 |
| 3,048,997 | 8/1962 | Rork et al. | 73—1 |
| 3,122,024 | 2/1964 | Trachtenberg | 73—517 |

VERLIN R. PENDEGRASS, Primary Examiner

U.S. Cl. X.R.

73—517